US010838158B2

(12) United States Patent
Tan et al.

(10) Patent No.: US 10,838,158 B2
(45) Date of Patent: Nov. 17, 2020

(54) MODULAR LASER CONNECTOR PACKAGING SYSTEM AND METHOD

(71) Applicant: CORNING INCORPORATED, Corning, NY (US)

(72) Inventors: Qing Tan, Santa Clara, CA (US); Mario Paniccia, Santa Clara, CA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/442,917

(22) Filed: Jun. 17, 2019

(65) Prior Publication Data

US 2019/0302382 A1   Oct. 3, 2019

Related U.S. Application Data

(63) Continuation of application No. 15/799,510, filed on Oct. 31, 2017, now abandoned.

(51) Int. Cl.
 *G02B 6/42* (2006.01)
 *F21V 8/00* (2006.01)
(52) U.S. Cl.
 CPC ......... *G02B 6/4248* (2013.01); *G02B 6/0006* (2013.01); *G02B 6/4202* (2013.01); *G02B 6/424* (2013.01); *G02B 6/428* (2013.01); *G02B 6/4212* (2013.01); *G02B 6/4256* (2013.01); *G02B 6/4263* (2013.01)
(58) Field of Classification Search
 None
 See application file for complete search history.

(56) References Cited

U.S. PATENT DOCUMENTS

| 4,186,996 A | 2/1980 | Bowen et al. |
| 4,192,574 A | 3/1980 | Henry et al. |
| 4,255,015 A * | 3/1981 | Adams ................. G02B 6/4204 385/76 |
| 4,316,204 A | 2/1982 | Inagaki et al. |
| 4,385,797 A | 5/1983 | Dubois et al. |
| 4,399,453 A | 8/1983 | Berg et al. |
| 4,461,538 A | 7/1984 | Breed, III et al. |
| 4,639,077 A | 1/1987 | Dobler |
| 4,709,979 A | 12/1987 | Spodati et al. |
| 4,725,128 A | 2/1988 | Bornzin et al. |

(Continued)

FOREIGN PATENT DOCUMENTS

| EP | 0241955 A1 | 10/1987 |
| FR | 2504693 A1 | 10/1982 |

(Continued)

OTHER PUBLICATIONS

International Search Report and Written Opinion in corresponding International Application No. PCT/US2018/05415, dated Dec. 26, 2018, 14 pages.

*Primary Examiner* — Michelle R Connelly

(57) ABSTRACT

A module for optically and structurally coupling a light diffusion optical fiber to a laser diode on a substrate in a compact module includes a fiber holder into which an exposed core of the laser extends and which is placed about the laser on a substrate such that the laser and fiber are axially aligned in butt coupled relation. A resilient strain relief housing is secured about the light receiving end of the fiber, and the fiber holder and substrate are inserted into the housing in a secured in a water sealing engagement.

16 Claims, 10 Drawing Sheets

(56) References Cited

U.S. PATENT DOCUMENTS

| | | | |
|---|---|---|---|
| 5,000,536 A | 3/1991 | Anderson et al. | |
| 5,065,011 A | 11/1991 | Fujihara et al. | |
| 5,647,044 A | 7/1997 | Basavanhally et al. | |
| 5,812,571 A | 9/1998 | Peters | |
| 6,231,245 B1 | 5/2001 | Buschelberger et al. | |
| 6,588,942 B1 | 7/2003 | Weld et al. | |
| 6,659,659 B1 | 12/2003 | Malone | |
| 6,832,860 B2 | 12/2004 | Yoon et al. | |
| 6,874,950 B2 | 4/2005 | Colgan et al. | |
| 7,111,992 B2 | 9/2006 | Kaneko | |
| 7,207,729 B2 | 4/2007 | Blom et al. | |
| 7,226,218 B2 | 6/2007 | Wang et al. | |
| 7,229,216 B2 * | 6/2007 | Yang | G02B 6/3849 385/88 |
| 7,347,632 B2 * | 3/2008 | Farr | G02B 6/4246 385/89 |
| 7,478,955 B2 | 1/2009 | Murry et al. | |
| 7,553,092 B2 | 6/2009 | Choi et al. | |
| 9,093,003 B2 | 7/2015 | Logunov et al. | |
| 9,103,999 B2 * | 8/2015 | Schunk | G02B 6/4277 |
| 9,146,347 B2 | 9/2015 | Logunov et al. | |
| 9,385,249 B2 | 7/2016 | Motohara | |
| 9,874,706 B2 | 1/2018 | Miyahara et al. | |
| 2003/0210873 A1 | 11/2003 | Moretti | |
| 2004/0037514 A1 | 2/2004 | Marion et al. | |
| 2004/0151442 A1 * | 8/2004 | Scruggs | G02B 6/4214 385/92 |
| 2006/0056778 A1 | 3/2006 | Wang et al. | |
| 2006/0239621 A1 | 10/2006 | Lo et al. | |
| 2007/0189677 A1 * | 8/2007 | Murry | G02B 6/4201 385/92 |
| 2012/0134627 A1 * | 5/2012 | Choo | G02B 6/4201 385/33 |
| 2014/0286363 A1 | 9/2014 | Kasai | |
| 2015/0241645 A1 * | 8/2015 | Khalid | G02B 6/4203 385/51 |
| 2015/0309272 A1 | 10/2015 | Cobb et al. | |
| 2015/0346411 A1 * | 12/2015 | Bauco | F21V 31/005 362/553 |
| 2016/0238784 A1 | 8/2016 | Logunov | |
| 2017/0040768 A1 | 2/2017 | Waclawik | |
| 2020/0101326 A1 * | 4/2020 | Zeringue | A61N 5/1067 |

FOREIGN PATENT DOCUMENTS

| | | |
|---|---|---|
| JP | 52029749 A | 3/1977 |
| JP | 55166973 A | 12/1980 |
| JP | 57084414 A | 5/1982 |

* cited by examiner

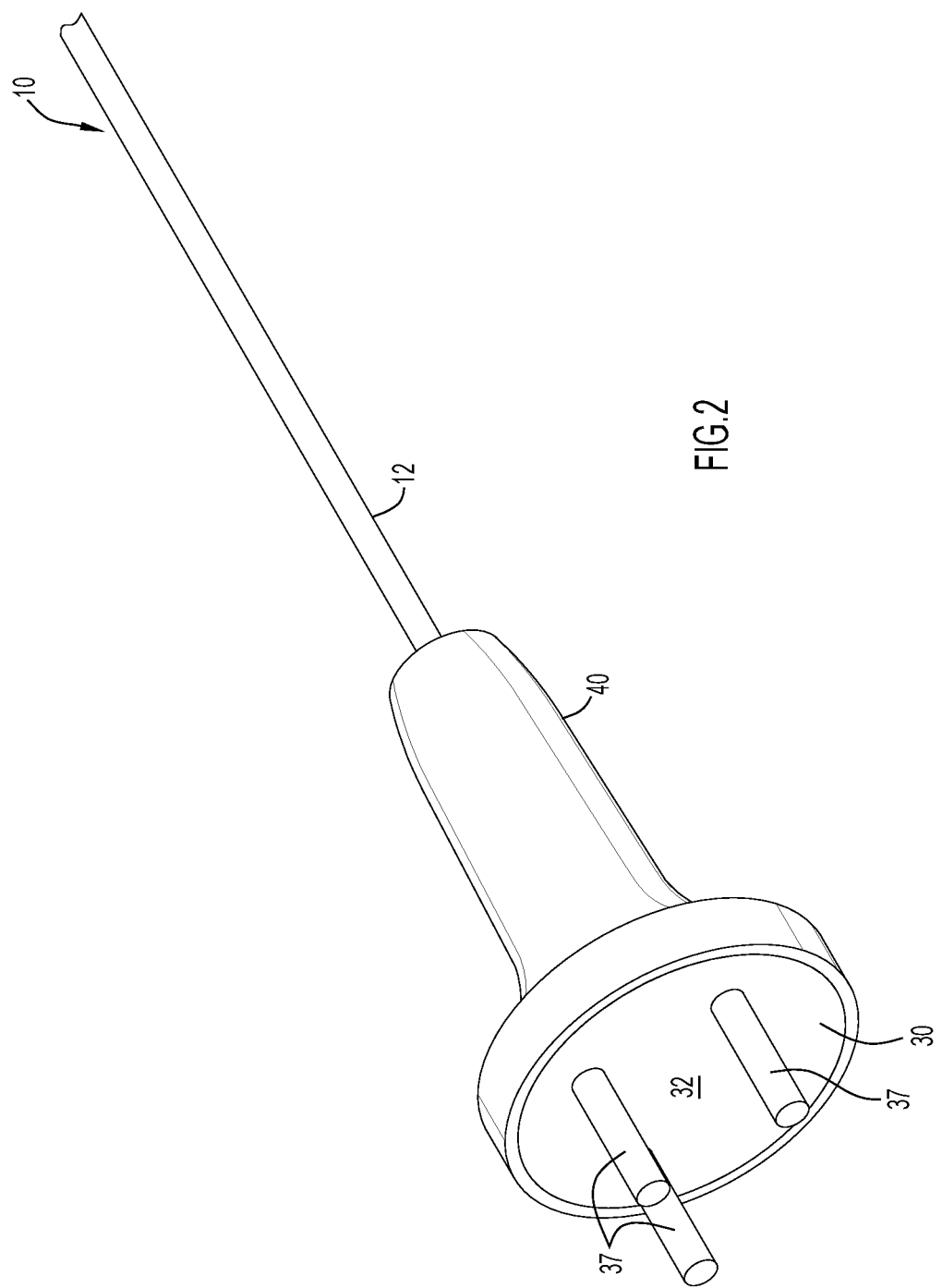

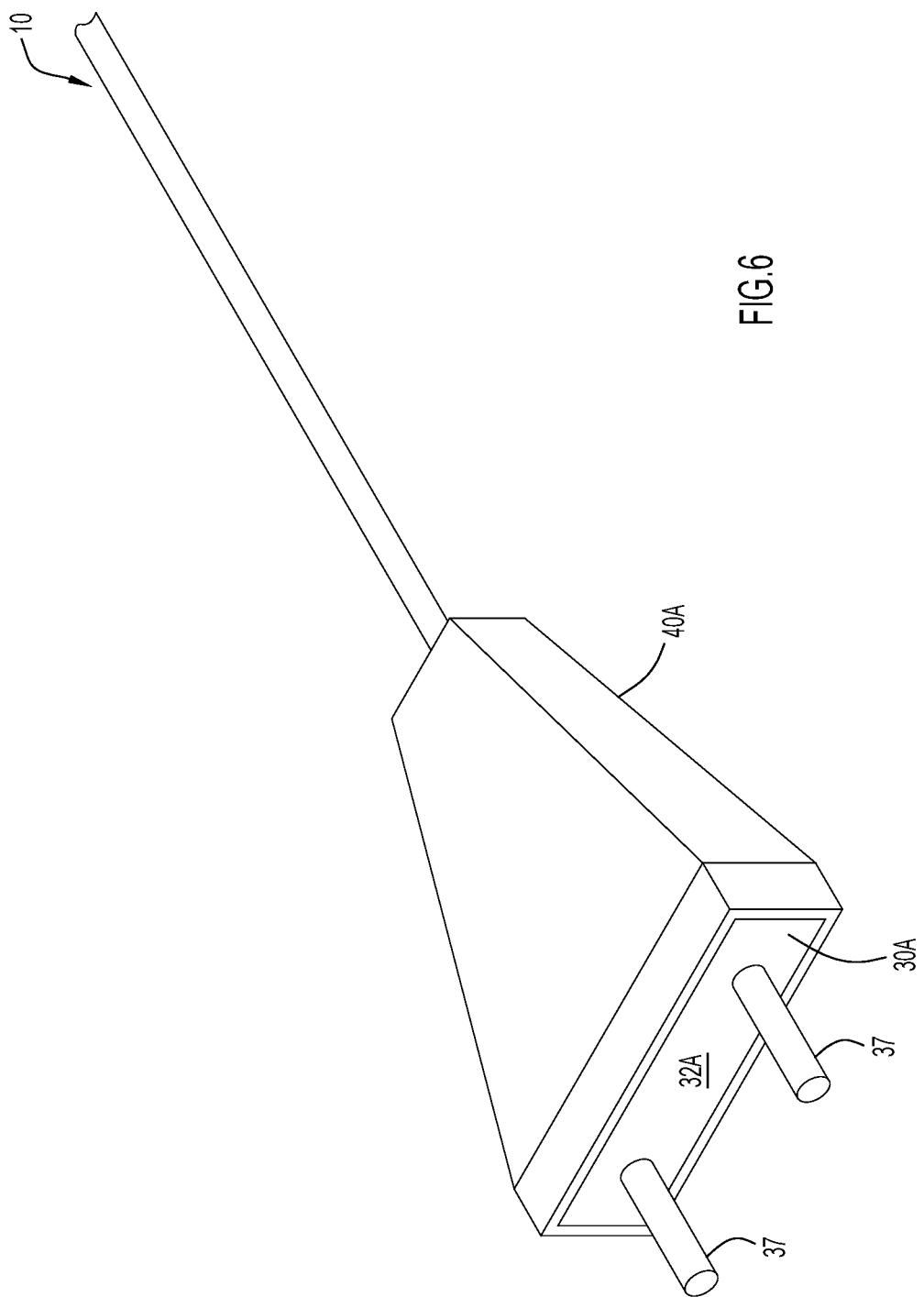

MODULAR LASER CONNECTOR PACKAGING SYSTEM AND METHOD

CROSS-REFERENCE TO RELATED APPLICATIONS

The present application is a continuation application to U.S. application Ser. No. 15/799,510, filed Oct. 31, 2017.

TECHNICAL FIELDS

The present invention provides an integrated smart module that efficiently optically couples and structurally connects lasers with light diffusion optical fibers and circuit boards.

STATE OF THE ART

Semiconductor lasers, and in particular VCSELs (Vertical-Cavity Surface-Emitting Lasers), are used in a variety of applications wherein the lasers are optically coupled to optical fibers to enable light output from the laser to be transmitted into and through the fiber. Various modules, assemblies or packages have been and are being used to hold and align the laser, other optical components, and optical fiber in order that the laser is as efficiently as possible optically coupled to the fiber. The process of aligning an optical fiber to a laser diode and fixing it in place can be a time-consuming and, therefore, costly step in the manufacturing process. Standard laser package types include coaxial or TO (transistor outline) can laser packages and butterfly laser packages.

In a conventional TO Can laser package, shown in FIG. 1A, for example, the laser (e.g., a laser diode) and the light-receiving end of the optical fiber may be mounted together within a substantially cylindrical housing. The laser is mounted on a laser submount on a TO Can post of a TO can header. The fiber end may be disposed in a rigid cylindrical ferrule mounted to the TO can housing, and the TO can housing may also contain other related components, such as a lens and a monitor photodiode, and is typically hermetically sealed.

In a butterfly type laser package, shown in FIG. 1B, for example, the laser and related components are mounted on a platform such as an optical bench within a metal boxlike housing that is hermetically sealed. The laser and laser circuitry are electrically connected to one or more pins extending laterally from the housing (e.g., 7 pins on each side, as shown). In one type of butterfly type housing, there is an opening in an end sidewall of the housing that receives a metal pipe or ferrule. The fiber is inserted through the ferrule into the inside of the housing and soldered to the ferrule for a sealed fit. Components such as an isolator and one or more lenses may be disposed on the platform between the laser and the input end of the fiber. Butterfly laser packages are generally more expensive than TO can laser packages and are generally used for higher performance requirement applications.

Both the TO Can and butterfly type packaging are relatively expensive to manufacture and have limited utility for consumer electronics applications, particularly for light diffusion fiber applications, where low cost and spatially efficient packaging are critical.

Thus, it is desirable to provide a module for coupling a laser to an optical fiber that is simple and inexpensive to manufacture and assemble and that is structurally and functionally reliable.

Terminology

It is to be understood that, unless otherwise stated or contextually evident, as used herein:

The terms "upper", "top", "lower", "bottom", etc., are used for convenience to refer to the temporary orientation of a device for demonstration purposes and are not intended to otherwise limit the structures described and claimed.

The terms "axial", "axially", "longitudinal", "longitudinally", etc., refer to dimensions extending parallel to the direction of light transmission in the disclosed optical fibers.

SUMMARY OF THE DISCLOSURE

With the foregoing objects in mind, the present invention provides a module for optically and mechanically coupling an optical fiber, such as a single mode optical fiber, to a laser diode, such as for example a VCSEL or a LED. The present invention also provides a method for fabricating such a module.

According to one aspect of the invention, a method for optically and structurally coupling an optical fiber to a laser on a substrate in a compact module comprises providing an optical fiber with a core tip exposed and extending from the fiber cladding at a light receiving end of the fiber which may be of the light diffusion type, The exposed core tip is extended into a fiber holder through an aperture in a closed end of the fiber holder. A laser diode is disposed on a top surface of a substrate, and an open end of the fiber holder is positioned on the top surface of the substrate surrounding the laser with the exposed fiber core tip in light-receiving butt-coupled relation to the laser. A resilient strain relief housing is disposed about the light receiving end of the fiber, and the fiber holder and at least the top surface of the substrate are inserted into the strain relief housing in water resistant sealing relation. The laser may, for example, be a VCSEL or LED.

According to another aspect of the invention there is provided a module assembly for optically and structurally coupling an optical fiber to a laser. The module assembly comprises an optical fiber (e.g., a light diffusion optical fiber) having a light-receiving end, an optically transmissive core and a cladding surrounding the core, wherein a portion of core extends axially from the cladding at the light-receiving end of the fiber. A fiber holder has an open end and a closed end with an aperture defined through the closed end, and the light-receiving end of the optical fiber is secured to the closed end of the fiber holder with the exposed core tip extending though the aperture into the holder. A substrate having top and bottom surfaces has a laser disposed on the top surface of said substrate. The open end of the fiber holder is secured to the top surface of the substrate surrounding the laser such that the exposed fiber core tip is butt-coupled to the laser in light-receiving relation. A resilient strain relief housing encloses and provides water resistant sealing for the light receiving end of the fiber, the fiber holder and at least the top surface of the substrate.

A gap in the range of a few microns to a couple of hundred microns may be provided between the butt-coupled laser and the exposed core tip of the optical fiber. The gap may be filled with epoxy having a refractive index matching the refractive index of the optical fiber.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

BRIEF DESCRIPTION OF THE DRAWINGS

FIG. 2 is a view in perspective from below of one embodiment of a laser package according to the present invention.

FIG. 6 is a view in perspective from below of a second embodiment of a laser package according to the present invention.

DESCRIPTION OF THE PREFERRED EMBODIMENTS

Figure 1A:
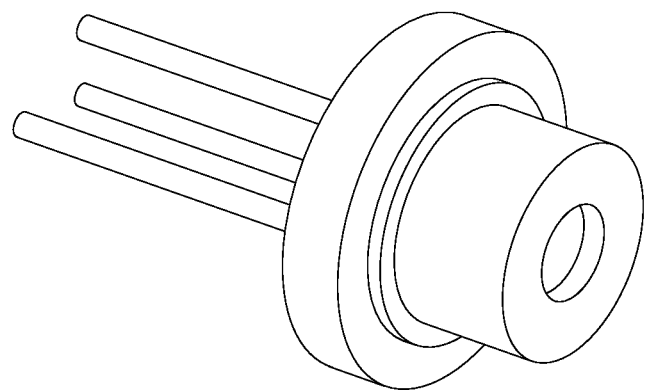
FIG. 1A is a view in perspective of a prior art TO Can type laser package as described above.
Figure 1B:
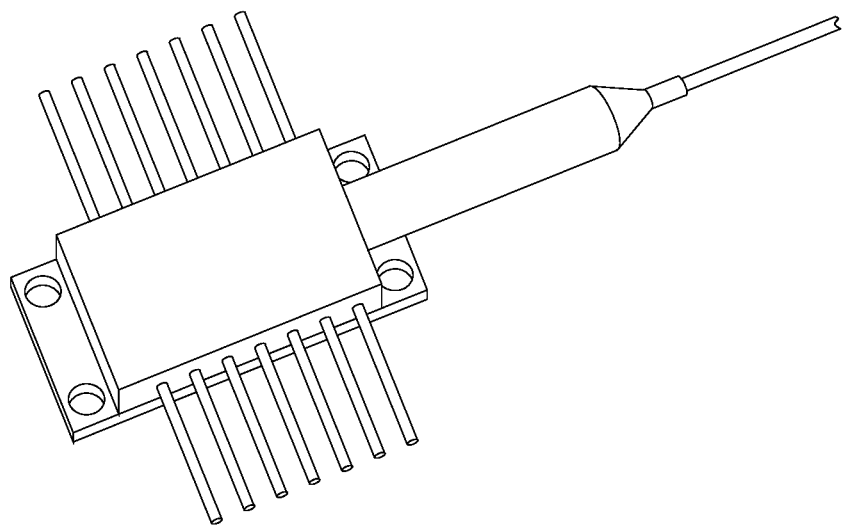
FIG. 1B is a view in perspective of a prior art butterfly type laser package as described above.
Figure 3A:
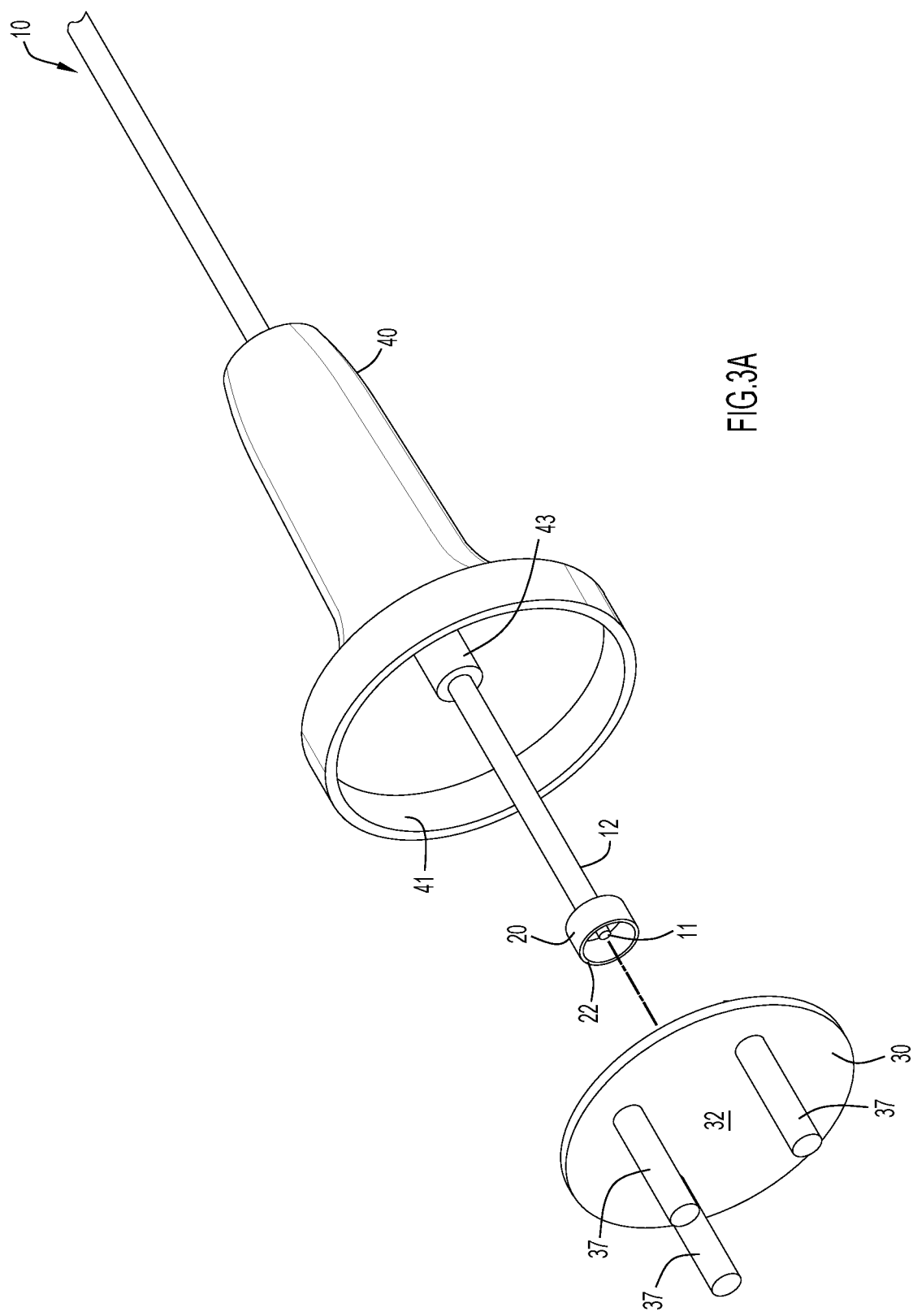
FIG. 3A is an exploded view in perspective from below of the embodiment of FIG. 2.
Figure 3B:
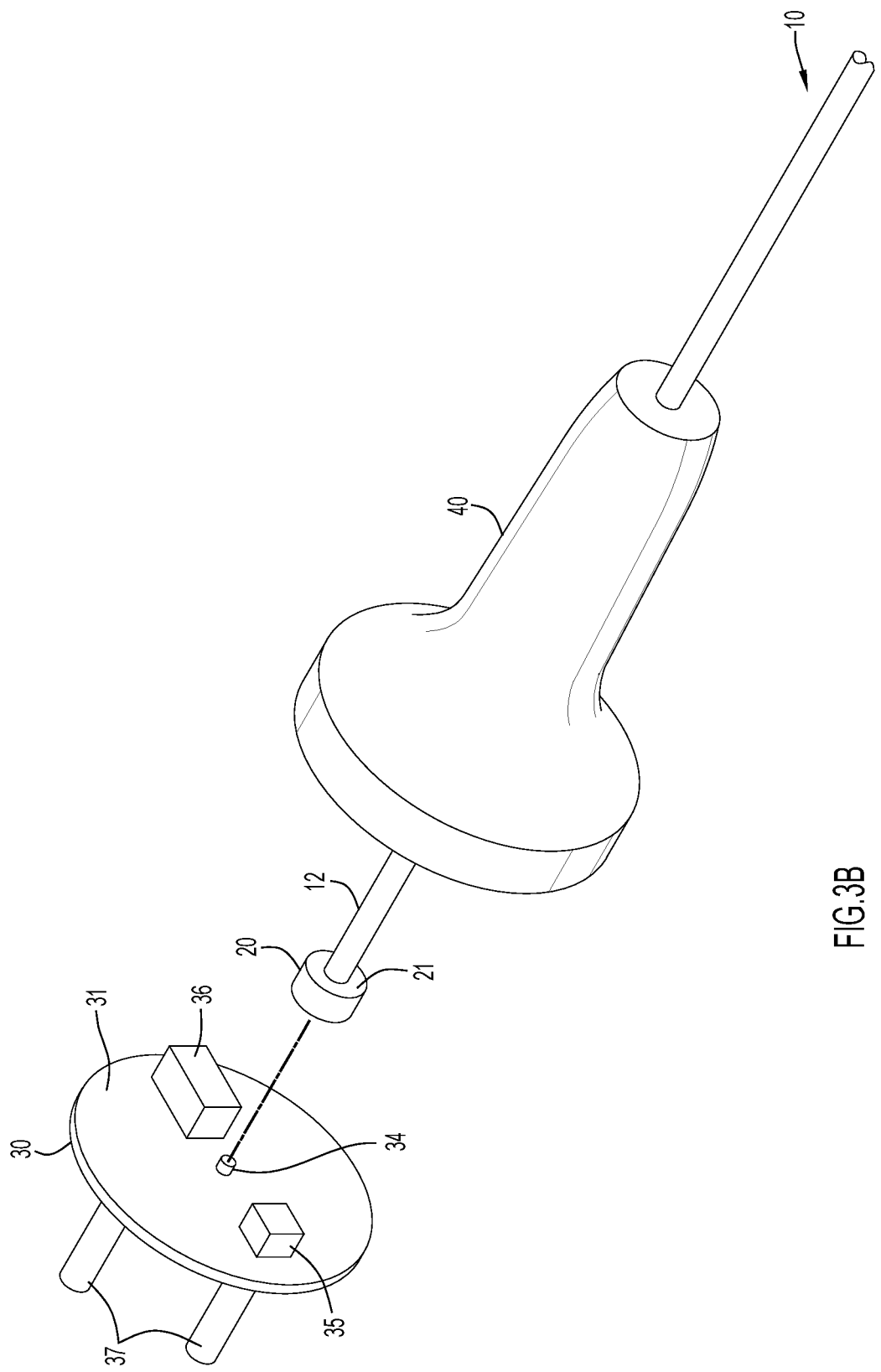
FIG. 3B is an exploded view in perspective from above of the embodiment of FIG. 2.
Figure 4:
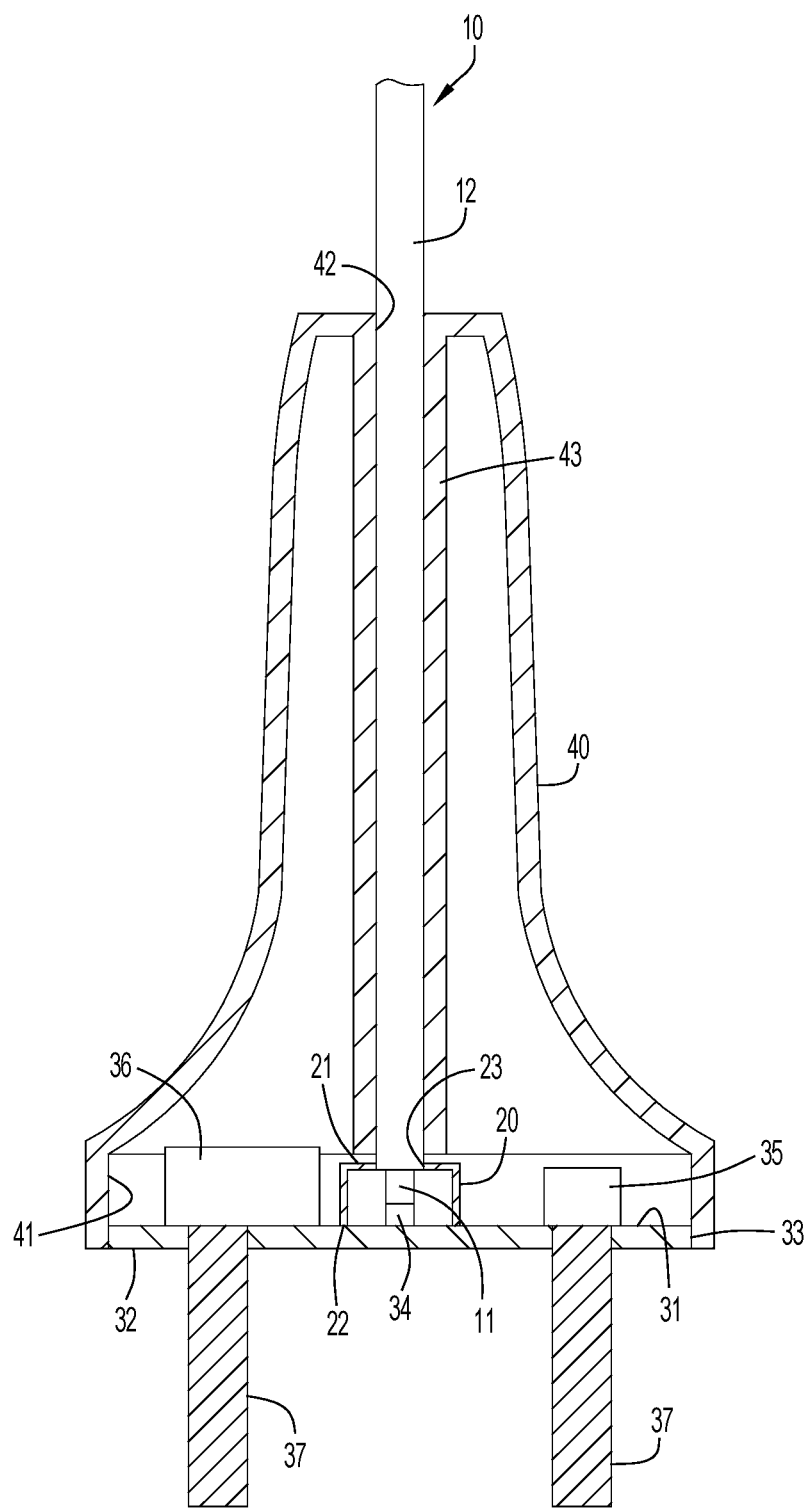
FIG. 4 is a view in longitudinal section of the embodiment of FIG. 2.

In the following detailed description, numerous specific details are set forth in order to provide a thorough understanding of the inventive concepts and how they may be practiced in particular embodiments. However, it will be understood that those inventive concepts may be practiced without these specific details. In other instances, well-known methods, procedures and techniques have not been described in detail so as not to obscure the present inventions.

The disclosure below is set forth in relation to particular embodiments and with reference to certain drawings; however, the inventions described herein are not limited to the drawings and are to be considered limited only by the claims. Moreover, it is to be understood that the drawings described herein are schematic in nature and are provided only to assist in understanding of the inventions described. In the drawings, the sizes of some of the elements may be exaggerated and not drawn to scale for illustrative purposes. The dimensions and the relative dimensions do not necessarily correspond to actual reductions to practice of the present inventions.

Referring to the embodiment illustrated FIGS. 2, 3A, 3B, 4 and 5, an optical fiber 10 has a light-transmissive core 11 surrounded by a cladding 12 which is cut away or otherwise removed at a light-receiving end of the fiber to expose a tip of the core. The fiber 10 is preferably a flexible light diffusing fiber utilized to scatter or diffuse light transversely out of the fiber. More specifically, light is guided away from the core 11 through the outer cladding 12 to provide illumination for applications, such as illuminated signage, displays, certain lighting fixtures, etc. It will be understood, that although the invention has particular application for flexible light diffusing fiber, the principles of the invention can be applied to other types of optical waveguides. Core 11 may be fabricated from glass or other suitable light-transmissive material. Cladding 12 may be made from a material having a low refractive index to provide a high numerical aperture (NA) similar to or lower than the refractive index of core 11. For example, the cladding material may be a low index polymer such as UV or thermally curable fluoroacrylate or silicone. Light diffusing fibers and their core and cladding materials are well known, some examples of which are disclosed in US20160238784 (Logunov), U.S. Pat. No. 9,093,003 (Logunov et al) and U.S. Pat. No. 9,146,347 (Logunov et al).

A fiber holder 20 has a closed proximal end 21 and an open distal end 22 and is preferably fabricated from a suitable polymer material. In the disclosed embodiment the fiber holder 20 has a generally cylindrical cup-shaped configuration but it will be appreciated that other configurations and materials consistent with the described functional requirements of the fiber holder may be employed. An aperture 23 is defined through the proximal end 21 of the fiber holder and is configured to circumferentially engage the exposed tip of core 11 inserted axially through the aperture. Aperture 23 is preferably centrally located in proximal holder end 21 such that the inserted tip of core 11 and holder 20 are concentrically aligned. The annular shoulder at the end of cladding 12 from, which the core tip extends, abuts and may be secured by suitable adhesive or other means to the exterior surface of proximal end 21 surrounding aperture 23.

A substrate 30, typically a printed circuit board (PCB), has an interiorly facing top surface 31, an exteriorly facing bottom surface 32 and a periphery 33. A laser diode 34, typically a VCSEL or LED, is disposed on the top surface 31 of the substrate 30. As depicted in the illustrated embodiment, miscellaneous electronic components 35, 36 may also be disposed on the substrate top surface. Electrical leads or wires 37 extend from bottom surface 32 for connection to external electrical components. In the illustrated embodiment the substrate 30 is round (i.e., a flat cylinder) and the laser diode 34 is positioned at the center thereof.

The annular open distal end 22 of fiber holder 20 may be secured by a suitable adhesive or other means to the top surface 31 of the substrate 30 in a concentric relation about laser diode 34 such that the exposed tip of core 11 in the fiber holder is aligned with and butt-coupled to the laser diode. Typically, the butt-coupling defines a small gap, anywhere from a few microns but no greater than a two or three hundred microns, between the laser diode 34 and the fiber core tip. For some applications the gap may be filled with epoxy having a refractive index matching the refractive index of the optical fiber. The laser diode 34 and exposed tip of core 11 are thusly coaxially aligned.

A housing 40, in the form of a resilient strain relief member, encloses the fiber holder 20 along with the top surface 31 and periphery 33 of substrate 30. The resilient strain relief housing 40 may have an elongated generally bell-shaped configuration that is open at its wide end, the interior surface 41 of which engages the periphery 33 of substrate 30 in water-resistant sealing relation. The narrow end of housing 40 is closed except for an axially centered aperture 42 defined therein that communicates with a hollow cylindrical fiber retaining tube 43 extending axially through the housing interior, terminating short of the open housing end. Tube 43 is configured to receive and circumferentially surround and engage fiber 10 such that the tip of the fiber core 11 extends in butt-coupling relation to the laser diode 34 as described above. Housing 40 may be made of rubber or other resilient material suitable for serving the protective strain relief and housing functions described herein.

In the structure as described the exposed tip of fiber core 11 extends into fiber holder 20 where it is butt-coupled to the laser diode 34. The strain relief housing contains and protects the coupling region as well as the top surface of the substrate. Although the annular end of the fiber cladding 12 may be secured to the closed end of fiber holder 20 as described, the positional engagement of the fiber may rely solely on frictional or other engagement within the fiber retaining tube 43.

Strain relief housing 40, being resilient, protects the fiber and its positioning against pulling or bending while enclosing and protecting the coupling region and top surface of the substrate in a water resistant engagement. The fiber holder 20 protects the butt coupling region within the housing and may also serve as a polishing holder.

In addition to the structure of the module, as described, the invention includes the method of assembling the module. The method includes the following steps performed not necessarily in the order recited. Optical fiber 10 is provided with an exposed tip of core 11 extending from the fiber cladding at the light receiving end of the fiber. The exposed core tip is inserted into fiber holder 20 through aperture 23 at the closed end of the fiber holder. Laser 34 is disposed on the top surface 31 of substrate 30, and an open end of the fiber holder 20 is placed on the top surface of the substrate surrounding the laser with the exposed fiber core tip in light-receiving butt-coupled relation to the laser. Because of the simple design this placement may be accomplished, without laser-fiber alignment complications, using standard pick and place robotic systems. Resilient strain relief housing 40 is secured about the light receiving end of the fiber, and the fiber holder 20 and at least the top surface 31 of the substrate 30 are inserted into and secured to the strain relief housing 40 in water resistant sealing relation.

Figure 5:
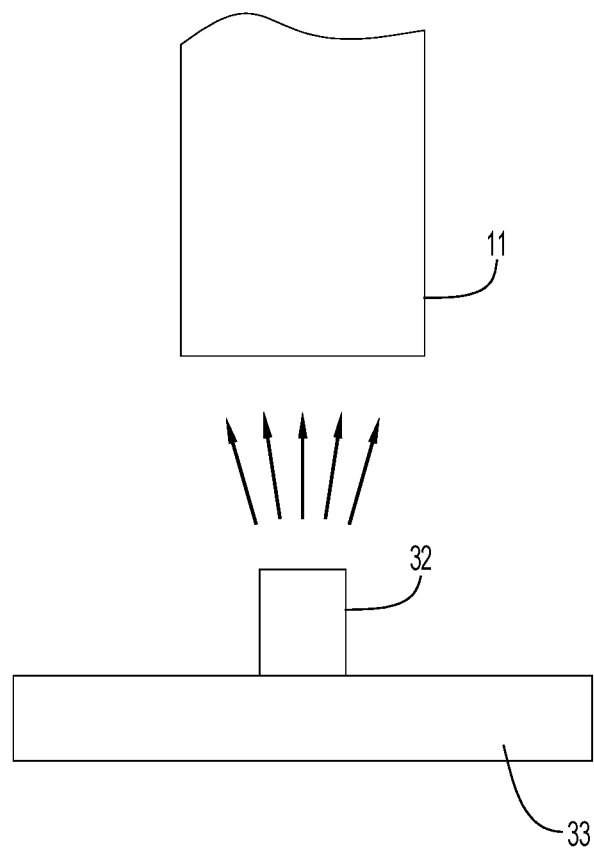
FIG. 5 is a schematic illustration of light transmitted between a laser and optical fiber in the embodiment of FIG. 2.
Figure 7A:
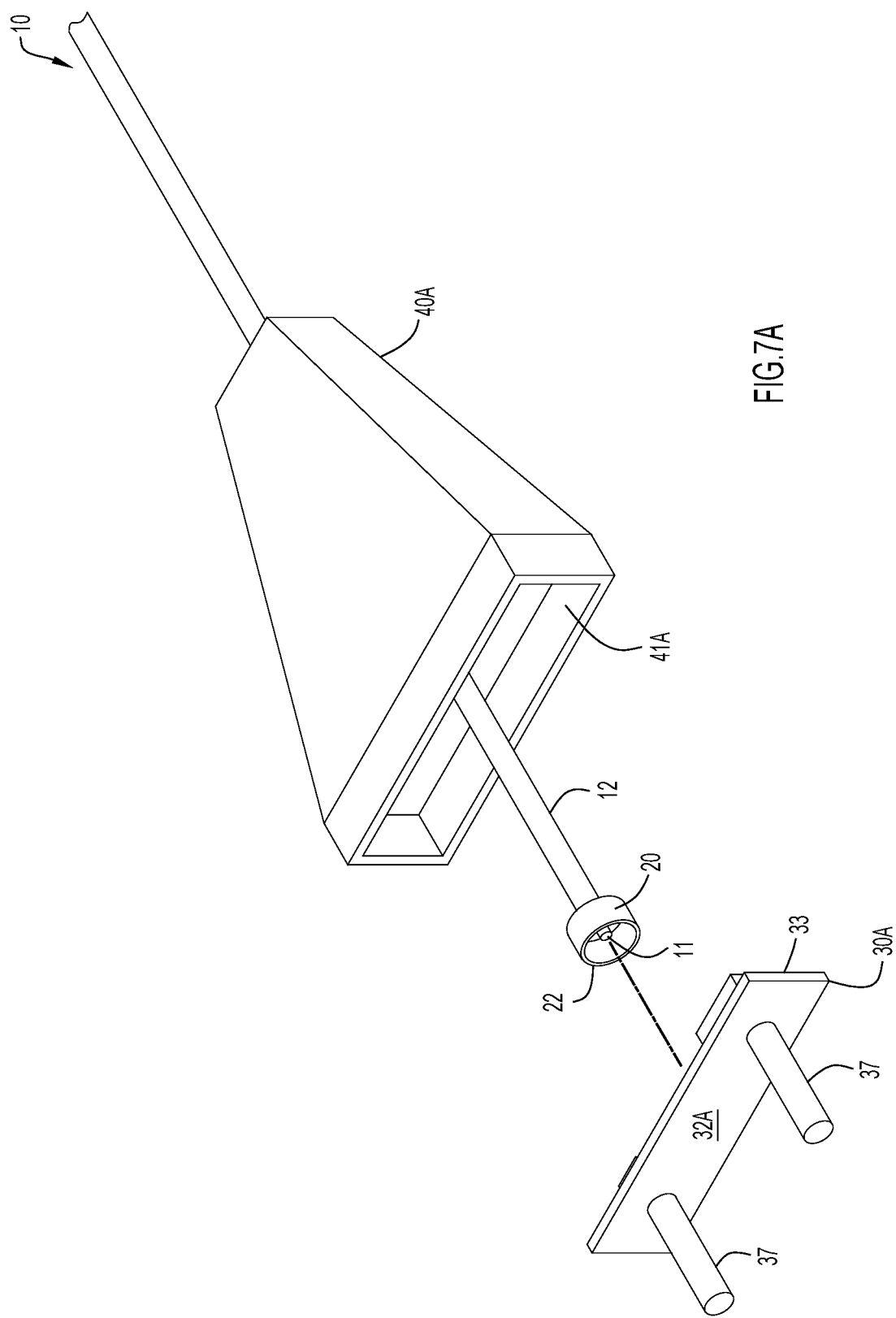
FIG. 7A is an exploded view in perspective from below of the embodiment of FIG. 6.
Figure 7B:
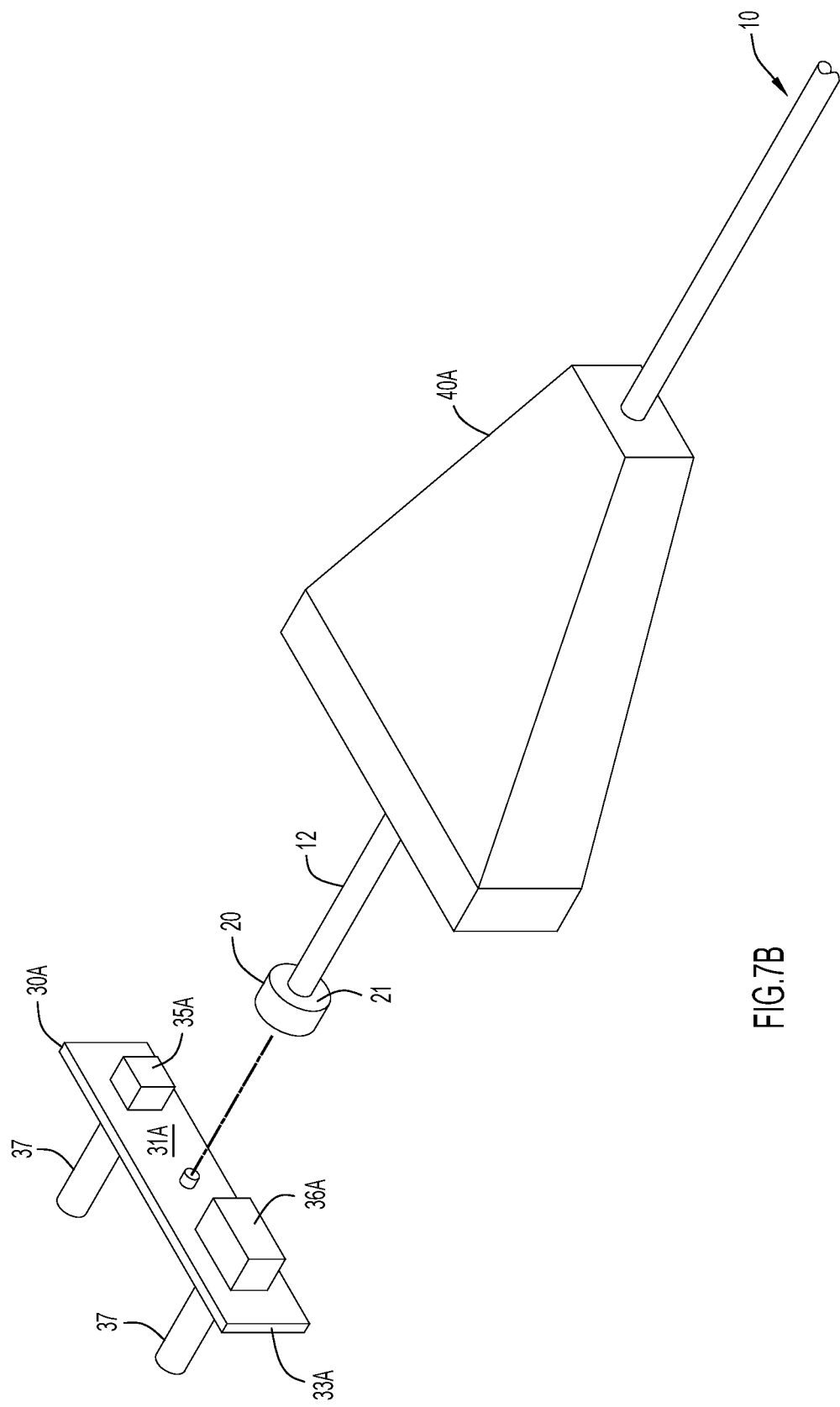
FIG. 7B is an exploded view in perspective from above of the embodiment of FIG. 6.
Figure 8:
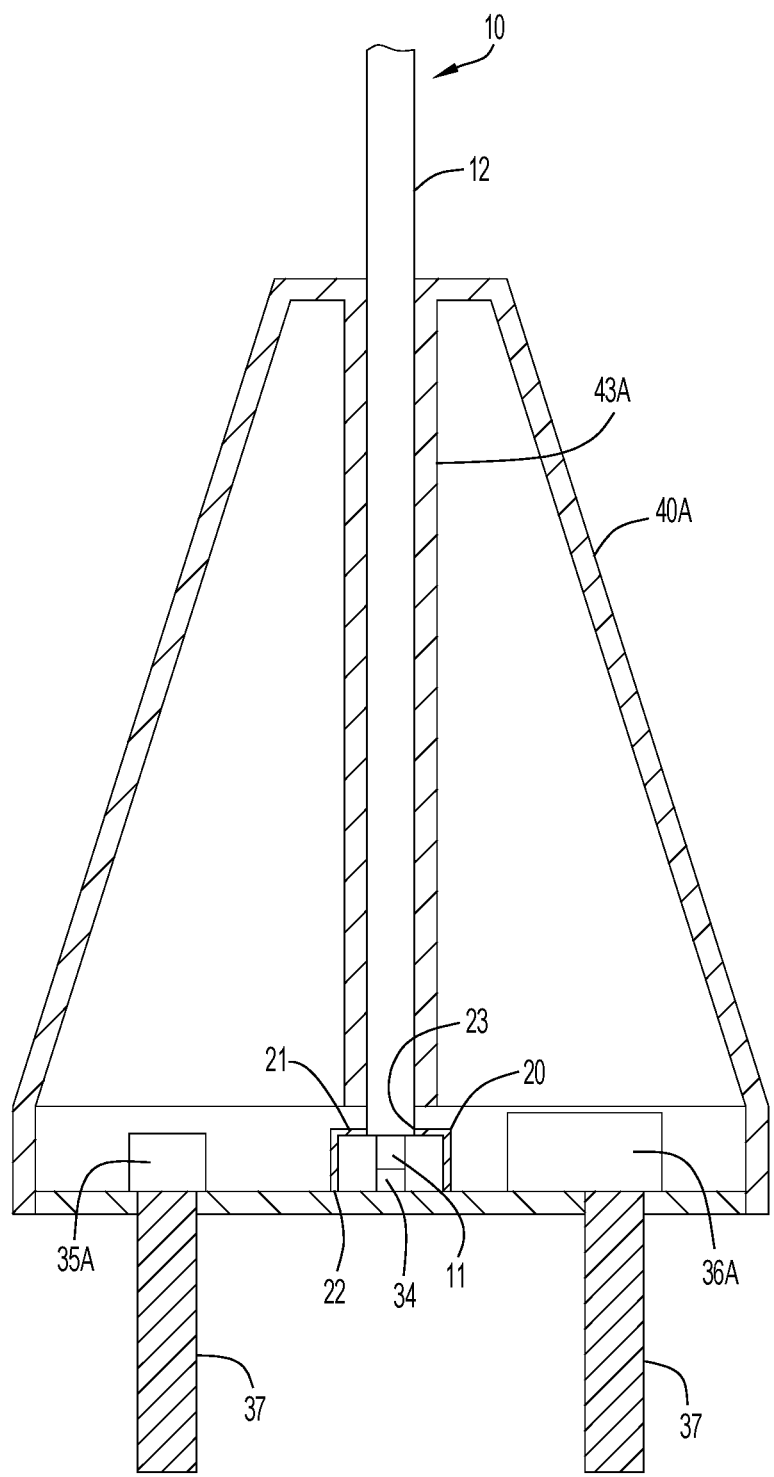
FIG. 8 is a view in longitudinal section of the embodiment of FIG. 6.

The schematic diagram of FIG. 5 shows the light transmission between laser 34 and the tip of fiber core 11 in the optical butt coupling arrangement. As described, the laser is preferably a VCSEL, but may be an LED. The gap between the laser and fiber core can be on the order of a few microns to a couple hundred microns, depending on the particular optical and structural design. The small gap between the laser and fiber core may be filled with index matched epoxy.

As noted above, although substrate 30 is illustrated as being circular (i.e., having a flat cylindrical configuration), that is not to be considered as a limiting feature of the invention since the substrate can be a regular or irregular polygon, ellipse, or other shape. In such embodiments the strain relief housing configuration would also be modified to accommodate the substrate configuration for providing the required enclosure and sealing functions. An example of this is illustrated in FIGS. 6, 7A, 7B and 8. Specifically, substrate 30A in this embodiment is shown as having a generally rectangular configuration with a top surface 31A, a bottom surface 32A, and a periphery 33A. Laser diode 34 is positioned on top surface 31A along with electronic components 35A, 36A. Electrical wires or leads 37 extend from the substrate bottom surface. Strain relief housing member 40A is configured as a trapezoid, truncated at its narrow top end with aperture 42A defined therein. Fiber retaining tube 43A extends axially through the housing interior, terminating short of the open housing end. Tube 43A is configured to receive and circumferentially surround and engage fiber 10 such that the tip of the fiber core 11 extends in butt-coupling relation to the laser diode 34 disposed on surface 31A as described above. Housing 40A has its open bottom end configured as a rectangle to match the rectangular periphery 33A of the substrate so that its bottom interior surface 41A can be secured to and provide water resistant sealing along that periphery.

The package design described and illustrated provides an integrated solution for laser driver electronics packaging, fiber alignment, strain relief, semi-hermetic sealing (or water resistance sealing) in one simple cost effective design. The advantages of the invention are several. Specifically, as described, the laser and fiber alignment can be accomplished using standard pick and place equipment; no active alignment step is required. Further, fiber holder 20 serves to provide not only a fiber holding function; it also provides protection for the laser diode and associated wiring. Moreover, the strain relief housing unit 40 serves to protect the optical fiber from pulling and bending forces and also protects and provides a water resistant seal for the overall module. Also, housing 40 is configured to permit the remainder of the laser module to be easily inserted therein and sealed, resulting in a simply assembled overall package that can easily be adapted to be fully waterproof.

It will be understood that the principles of the invention apply to embodiments other than those specifically described and illustrated. For example, if desired, holder 20 can be replaced with index matched, transparent encapsulation epoxy. The substrate, instead of a PCB, may be a ceramic package or a lead frame package.

As described herein the invention includes structure and a method of fabricating a structure for a module for coupling a laser diode (e.g., a VCSEL) with light diffusion fiber in butt-coupling relation. The package design integrates solutions for laser driver electronics, and a housing that effects fiber alignment, strain relief, and semi-hermetic sealing (or water resistance sealing) in one simple cost effective design. A PCB assembly is nested into the strain relief housing.

The laser module described is a simple, low cost laser package designed for light diffusion fiber. Only two leads 37 (Vcc and GND) are required to operate the module, although pulse width modulation (PWM) signals can be provided on a third lead with additional functionality (such as light intensity control, dimming, etc.).

As noted herein, although the invention has been disclosed with primary application for VCSELs, the principles are equally applicable for other lasers, particularly laser diodes that can be mounted on a substrate of the type described.

Having described preferred embodiments of new and improved modular laser connector packaging and method, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for optically and structurally coupling an optical fiber to a laser or LED light source on a substrate in a compact module, wherein the optical fiber comprises a core tip exposed and extending from the fiber cladding at a light receiving end of the fiber and wherein the substrate is a printed circuit board comprising a top surface on which the laser or LED light source is disposed, a bottom surface, and a periphery, the method comprising:

extending the exposed core tip into a fiber holder through an aperture in a closed end of the fiber holder;

positioning an open end of the fiber holder on the top surface of the substrate surrounding said light source with the exposed fiber core tip in light receiving butt-coupled relation to said light source;

securing a resilient strain relief housing about the light receiving end of said fiber, wherein the strain relief housing is made of rubber; and inserting said fiber holder and the top surface and periphery of said printed circuit board into said strain relief housing in water resistant sealing relation such that the periphery of said printed circuit board abuts an interior surface of said strain relief housing proximate an open end of said strain relief housing.

2. The method of claim 1 wherein the light source comprises a VCSEL on the top surface of the substrate.

3. The method of claim 1 wherein positioning an open end of the fiber holder includes leaving a gap in the range of a few microns to a couple of hundred microns between the butt-coupled light source and the exposed core tip of the optical fiber.

4. The method of claim 3 further comprising filling said gap with epoxy having a refractive index matching the refractive index of the optical fiber.

5. The method of claim 1 wherein the printed circuit board has electronic components on said top surface, and wherein inserting the top surface of the substrate includes securing the housing about the substrate and the electronic components.

6. The method of claim 5 further comprising extending electrical leads from the bottom surface of said substrate outside said housing.

7. The method of claim 1 wherein the fiber holder is provided in a generally cylindrical cup-like configuration.

8. The method of claim 1 wherein said fiber holder is provided as a transparent encapsulation epoxy having a refractive index matching the refractive index of the optical fiber.

9. The method of claim 1 wherein said positioning an open end of the fiber holder on the top surface of the substrate comprises employing a pick and place robotic system to so position the fiber holder.

10. A module assembly for optically and structurally coupling an optical fiber to a light source, the module assembly comprising:

an optical fiber having a light-receiving end, an optically transmissive core and a cladding surrounding said core, wherein a portion of said core extends axially from said cladding at said light-receiving end;

a fiber holder having an open end and a closed end with an aperture defined through said closed end;

wherein the light-receiving end of said optical fiber is secured to said fiber holder with said core tip extending though said aperture into said holder;

a substrate having a top surface, a bottom surface, and a periphery, wherein the substrate is a printed circuit board and wherein the light source is disposed on said top surface of said substrate;

wherein the open end of said of said fiber holder is secured to the top surface of said substrate surrounding said light source with said fiber core tip butt-coupled to the light in light-receiving relation; and a resilient strain relief housing enclosing and providing water resistant sealing for the light receiving end of said fiber, said fiber holder, and the top surface and periphery of said substrate, wherein said resilient strain relief housing is made of rubber and wherein said housing has an open end with an interior surface, said interior surface abutting the periphery in sealing engagement.

11. The module assembly of claim 10 further comprising a plurality of electrical leads extending from said module at the bottom surface of said substrate.

12. The module of claim 10 wherein said light source is selected from the group consisting of a VCSEL and a LED.

13. The module of claim 10 wherein said fiber core tip is spaced from said light source by a gap no greater than a few hundred microns.

14. The module of claim 13 wherein said gap is filled with epoxy having a refractive index matching the refractive index of the optical fiber.

15. The module of claim 10 further comprising electronic components disposed on said top surface of said substrate and within said housing.

16. The module of claim 10 wherein said fiber holder has a generally cylindrical cup-like configuration.

* * * * *

UNITED STATES PATENT AND TRADEMARK OFFICE
CERTIFICATE OF CORRECTION

Page 1 of 1

PATENT NO. : 10,838,158 B2
APPLICATION NO. : 16/442917
DATED : November 17, 2020
INVENTOR(S) : Qing Tan et al.

It is certified that error appears in the above-identified patent and that said Letters Patent is hereby corrected as shown below:

In the Claims

In Column 8, Line 18, Claim 10, before "fiber holder" delete "of said".

Signed and Sealed this
Sixth Day of April, 2021

Drew Hirshfeld
*Performing the Functions and Duties of the
Under Secretary of Commerce for Intellectual Property and
Director of the United States Patent and Trademark Office*